June 4, 1940.　　　P. G. WILLETTS　　　2,203,288
CONTAINER FOR MOLTEN GLASS
Filed April 29, 1936　　2 Sheets-Sheet 1
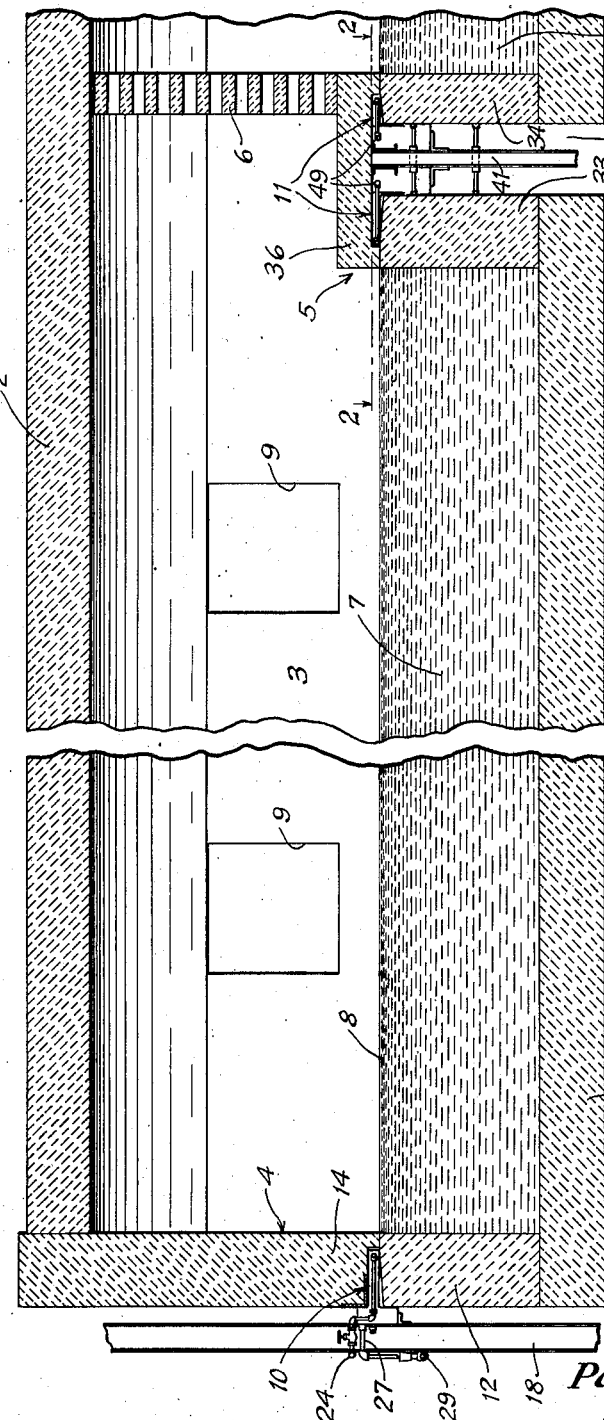
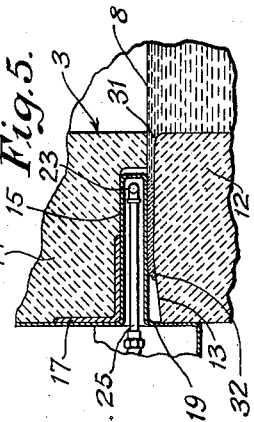
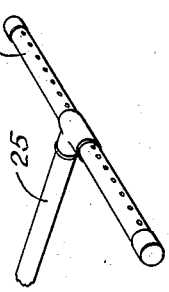
Witness:
A. A. Horn
Inventor:
Paul G. Willetts
by Brown & Parham
Attorneys.

June 4, 1940.  P. G. WILLETTS  2,203,288
CONTAINER FOR MOLTEN GLASS
Filed April 29, 1936  2 Sheets-Sheet 2
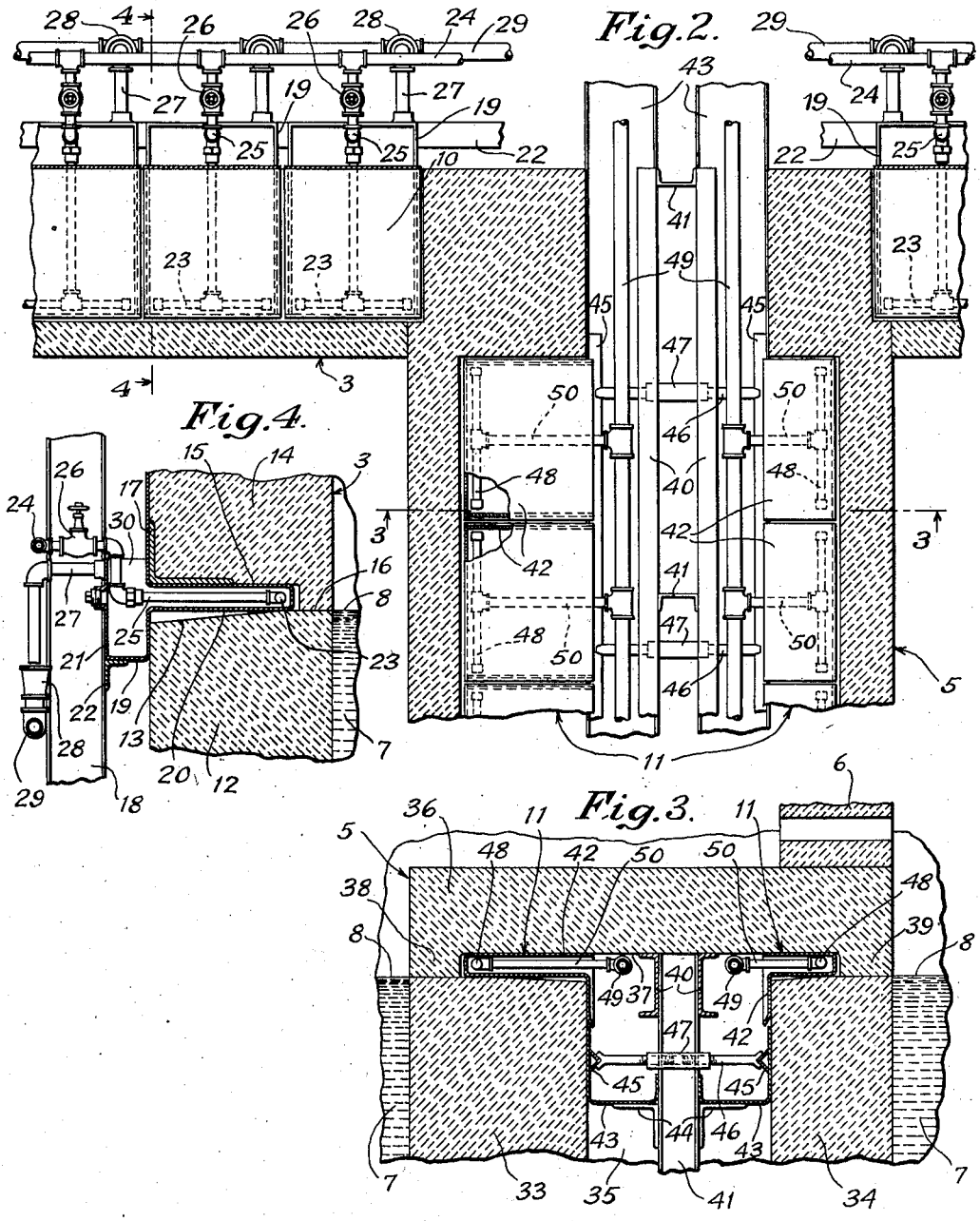
Witness:
A. A. Horn
Inventor:
Paul G. Willetts
by Brown & Parham
Attorneys.

Patented June 4, 1940

2,203,288

UNITED STATES PATENT OFFICE 2,203,288

CONTAINER FOR MOLTEN GLASS

Paul G. Willetts, Bolton Center, Conn., assignor to Hartford-Empire Company, Hartford, Conn., a corporation of Delaware Application April 29, 1936, Serial No. 76,967

4 Claims. (Cl. 49—54)

This invention relates to containers for molten glass, as for example glass melting or refining tanks or furnaces, and more particularly to the construction and the cooling of such containers adjacent to the metal line thereof in order that the life of the containers as a whole may be greatly increased.

It is standard practice in making glass in commercial installations to maintain the surface of glass in a container of this character at a certain predetermined height. It has been found in practice that the corrosive and erosive effects of the glass upon the refractory blocks of which such containers are formed at the metal line is much more severe than at other portions of the containers, and due to this fact, the blocks wear and/or are corroded or eroded away adjacent to the metal line until finally the blocks become so thin at this point as to render continued use of the device dangerous. The tanks must then be shut down, the glass drained out, and the tanks repaired or rebuilt. In modern commercial tanks this is a considerable undertaking, both as to time and cost.

An object of the present invention is to provide a novel form of cooling substantially at the metal line in containers for molten glass, and more particularly to provide such cooling that after a period of use of the container, the boundary for the surface glass at the metal line thereof will be in effect formed by chilled or frozen glass.

A further object of the present invention is to provide for the effective cooling of containers for molten glass at the metal line in such manner that the boundary of chilled glass above referred to will be effective to define a surface area of glass larger in some dimensions at least than the corresponding dimension of the bath beneath the metal line as defined by the refractory blocks of which the container is made.

A further object of the present invention is to provide for the cooling of glass-contacting walls in a container for molten glass as aforesaid, applicable to bridge walls disposed in a container for molten glass.

A further object of my invention is to provide such a construction for containers of the character above described that the life of the glass-confining refractories will be increased, due to the prevention of the exposure of their upper surfaces initially or after use to excessive temperatures, whether the positive cooling means be employed or not and by a novel arrangement of the refractories of which such structures are built.

Other and more specific objects of the present invention will become apparent from the following specification and appended claims when taken in connection with the accompanying drawings, in which:

Figure 1 is a diagrammatic view of a portion of a glass-making tank or furnace, the view being substantially in longitudinal vertical section and having a part broken out near the center thereof and another part at one end broken away and omitted;

Fig. 2 is a fragmentary view on an enlarged scale and substantially in horizontal section taken on the line 2—2 of Fig. 1;

Fig. 3 is a fragmentary view similar to a portion of Fig. 1 but on an enlarged scale and taken substantially on the line 3—3 of Fig. 2;

Fig. 4 is a fragmentary view in vertical section taken substantially on the line 4—4 of Fig. 2;

Fig. 5 is a view similar to Fig. 4 showing the condition of the parts after they have been in use for a period of time; and Fig. 6 is a perspective view of one of the cooling nozzles usable with a cooling fluid, such as water.

Referring to the drawings, and particularly to Fig. 1 thereof, I have illustrated a conventional type of glass making tank including a bottom 1, the showing of which is intended to be purely diagrammatic, a crown 2, side walls 3, an end wall 4, and a bridge wall generally indicated at 5, there being a conventional shadow wall 6 built up above the bridge wall 5 as shown. Molten glass 7 is adapted to be maintained within the container or tank up to the level indicated at 8. I have illustrated in Fig. 1, openings 9, which may be used as air and fuel ports through which combustible media may be supplied to the tank or furnace for heating the same and waste products of combustion exhausted alternately as in the usual tank practice. The means by which the batch material for producing the molten glass is introduced into the tank have not been illustrated in the accompanying drawings, but it may be assumed that such batch material may be introduced into the tank in any desired or conventional manner.

I contemplate that my novel means for applying cooling liquid substantially at the metal line may be employed in conjunction with the vertical wall portions confining the bath of molten glass at least as to such portions confining the hotter parts of such bath. There is shown in Fig. 1, a novel cooling means according to my invention at 10 associated with the end wall 4, this means being shown in greater detail in Figs. 2, 4 and 5. I have also shown in Fig. 1 cooling means 11 associated with the bridge wall, these means being shown in greater detail in Figs. 2 and 3. Inasmuch as each of the means employed on any of the outer walls of the tank are or may be substantially the same, these means will be described more particularly with reference to Figs. 2, 4 and 5, while the means for cooling the bridge wall which are in some respects similar to the means employed for cooling the side walls will be described more particularly in conjunction with Figs. 2 and 3.

Referring to Figs. 1, 2, 4 and 5, the wall 3 is preferably constructed of glass contacting blocks 12, which extend from adjacent to the bottom of the bath of glass 7, as indicated in Fig. 1, up to the metal line 8. The tops of the blocks 12 are preferably beveled downwardly and outwardly as indicated at 13.

The upper portions of the walls 3 may be constructed of blocks 14, which are provided with recesses 15 at their lower outer portions for accommodating a cooling means hereinafter more specifically to be described. The lower inside portions of the blocks 14 are arranged initially to rest upon the inner upper portions of the blocks 12, as shown at 16, Fig. 4. The blocks 14 are preferably supported independently of the glass contacting blocks 12, as for example by supporting them upon structural angle members 17, Figs. 4 and 5, these angle members being shown as located in suitable further recesses formed in the blocks 14. It will be understood that the angle members 17 may be supported in any suitable manner from the usual buckstays indicated at 18, Figs. 1 and 4.

Extending into the recesses 15 are a plurality of casings or shields 19, which may be constructed of sheet metal, these shields being somewhat L-shaped in vertical cross section and each having a horizontally extending portion 20, which is disposed within the recess 15, and a vertical leg indicated at 21 extending downwardly along the outer faces of the blocks 12 as shown. The shields 19 may be supported in any conventional manner as by structural angles 22, which may be suitably secured to the buckstays 18.

Means are provided in association with each of the shields 19 for supplying a liquid cooling medium thereto. As shown, such means comprise a perforated pipe 23, best illustrated in Fig. 6, which is disposed horizontally and parallel with the inside surface of the blocks 12 and 14. The perforations of the pipe 23 are directed toward the inside of the tank or container for molten glass to supply the maximum cooling effect at the inner portions of the cooling means and a relatively lesser cooling effect toward the outer portions thereof adjacent to the outside of the glass-contacting walls or blocks. Means are provided for supplying a cooling liquid, such for example as water, to the perforated pipes 23, comprising a supply pipe 24 communicating with the pipes 23 through branch pipes 25, flow through each of which is controlled by an adjustable valve 26. The casings or shields 19 are preferably maintained substantially full of the cooling liquid, and for this purpose they are provided adjacent to their upper end portions with overflow pipes 27, which lead outside over funnel means 28 communicating with a drain pipe 29, Figs. 2 and 4. The shield 19 is open to the outside as indicated at 30, so that should the water or other cooling liquid therein be vaporized, the vapor may freely escape from the device. It is contemplated, however, that a cooling liquid, such as water, will be supplied at a sufficient rate so that the vaporization wil not be excessive.

After the device has been constructed as above described and has been in operation for some time, the corrosive action of the glass effective primarily at the surface thereof will eat away the upper portion of the blocks 12, as shown at 31, Fig. 5, permitting the surface glass to penetrate over the upper surface of the block perhaps to some point as shown at 32 in this figure. However, the action of the cooling means just described will be effective to withdraw sufficient heat from this glass which has flowed over the upper surface of the blocks 12, so that the outer portion of this glass will be chilled beneath the shield 19 to form a boundary of chilled glass for the surface glass in the container, which boundary will be located intermediate the lines of the inner and outer vertical surfaces of the blocks 12. This chilled glass will be substantially unaffected by the corrosive and erosive effects of the molten glass at the surface of the bath and should some of it be washed away, the glass replacing this portion will be chilled due to heat extracted by the cooling means, so that there will in effect be a metal line boundary of chilled glass of the same character and composition as the molten glass in the container. This boundary portion of glass cannot be permanently injured by the molten glass in the container and thus serves as an effective line of resistance against further wear at this point. If, then, the blocks 12 be of material having a relatively high thermal conductivity, the container as a whole will be much more permanent in use, that is, it will have a very much longer life than any prior art container to my knowledge. One such material which may be cited as an example of materal advantageously usable as aforesaid is that disclosed in my prior Patent No. 1,832,678, granted Nov. 17. 1931.

The bridge wall 5 (Figs. 1, 2 and 3) may be built up of a pair of spaced vertical walls formed of blocks 33 on the one side and blocks 34 on the other. The blocks 33 are preferably of greater thickness than the blocks 34 as they are in contact with hotter glass than that in contact with the blocks 34. In each case, however, the tops of these blocks are beveled downwardly toward the open space 35 intermediate the spaced walls. Extending across between the upper portions of the blocks 33 and 34 are cover blocks 36, which are provided with recesses 37 on their undersides extending across a major portion of the width of the blocks, but spaced from the lateral sides thereof, to provide downwardly extending portions 38 and 39 adapted initially to engage the upper surfaces of the blocks 33 and 34 adjacent to the glass contacting faces thereof. The cover blocks 36 are supported independently of the blocks 33 and 34, however, upon spaced, horizontal structural channel members 40, which in turn are supported upon vertical structural channel members 41, the latter being supported in any suitable manner (not shown) from the external support of the tank or furnace.

The cooling means 11 are preferably located in the lateral end portions of the recesses 37, as shown, and comprise metallic shields 42, similar in many respects to the shields 19, with the exception that in this case there are no bottom trough-like portions to confine a body of the cooling liquid, this liquid being allowed to run freely down the shields into troughs 43 and thence to one side of the structure to some suitable drain point. The troughs 43 may be supported from the vertical structural members 41 by means of suitable angles 44, as shown.

There is also illustrated extending between the upper portions of the blocks 33 and 34 and engaging V-shaped metallic members 45, compression members 46 provided with turn buckles 47 intermediate their ends, so as properly to brace the upper portions of the blocks.

At the inner ends of the shields 42, that is, the portions toward the glass-contacting surfaces of the blocks 33 and 34, are arranged perforated pipes 48, which may be formed in the same manner as the pipes 23 shown in Fig. 6. Means are provided for supplying a cooling liquid, such as water, to the pipes 48, such means preferably including the supply pipes 49 and branch pipes 50. The general arrangements for cooling and the functions and operation of the cooling means associated with the bridge wall may be substantially the same as those previously described for the side walls, the only difference being that in this case the cooling is effected solely by continuous streams of water or other cooling liquid supplied through the pipes 48 to the inside of the shields 42 and thence running down the shields into the troughs 43, no attempt being made to maintain baths or pools of the cooling liquid above or at the outside of the upper edges of the blocks 33 and 34.

It will be noted that the cooling means in so far as it is directly effective upon the glass is located in a substantially horizontal fashion and at such a level that it is above the normal level of the bath of glass in the container, so that molten glass will not come into direct contact therewith to any material extent, the blocks 12 serving to confine the bath of molten glass and being substantially uncooled except for a portion of the upper outer edge thereof and except for the top surface thereof where the maximum cooling effect is directed. In this way, the confining of the glass depends upon the integrity of the glass confining blocks 12, which is a desirable condition so as to minimize the cost of cooling. At the same time, the cooling is directed toward saving the weakest part of the structure as has been proven by the experience of the prior art, namely, the metal line portion of the glass confining blocks and providing what may be in effect termed a glass container having no refractory material in contact with the glass at the metal line after the structure has been in use for a period of time, this period of time being in practice about two to three weeks.

In the prior art, it has been almost universal practice to maintain the level of glass in a glass container or tank somewhat below the tops of the glass-confining blocks, perhaps two or three inches. It is also well known, as aforesaid, that the most rapid wear of the glass-confining blocks in tanks for glass takes place substantially at the metal line, that is, at the surface at which the glass is normally maintained. The result of these two factors has been that the portions of the glass-confining blocks at and above the metal line, are destroyed more rapidly than the portions of the blocks therebeneath, to leave a material space between the normal glass level and the under surface of the blocks of the breast wall above the glass-confining blocks. The highly heated combustion gases in the structure above the glass have circulated in and out of this space due to its relatively large size. This has resulted in subjecting the glass-confining blocks to heat on two sides adjacent to the surface of the glass, that is on the front vertical wall which normally is in contact with the glass and on the top surface contiguous therewith. Thus the glass-confining blocks are subjected to very high temperatures on two adjacent surfaces, as well as to the corrosive and erosive action of the glass, which has resulted in the rapid destruction thereof.

I have found that by constructing the portion of the breast wall, which defines a boundary of the flame space above the glass with the inner surfaces of the blocks of such wall substantially in the same vertical plane as the inner surfaces of the glass-confining blocks, and by having the breast wall blocks extend to a very short distance from the glass line, I am enabled substantially to prevent the circulation of the highly heated gases underneath the blocks of the breast wall, which would subject the glass-confining blocks to heat from above. This is true whether the glass-confining blocks extend substantially to the metal line, as shown in Fig. 4, or whether they extend to within a short distance of, but below, such metal line, as shown in Fig. 5. (They may also if desired be built initially as shown in Fig. 5.) In any case, according to my invention, there will be no possibility of subjecting the glass-confining blocks to substantial heating influences from above which operate as aforesaid in conjunction with the heating of the vertical surface exposed to the glass to cause excessive wear. It will be understood, of course, that this protection of the tops of the glass-confining blocks is present whether or not artificial cooling means, such as herein disclosed, are used, but that should such means be used, the protecting effect of the construction is augmented and its useful life prolonged.

I am aware that the prior art has proposed the cooling of large portions of the vertical area of glass-contacting blocks, but these attempts have fallen short of attaining the desired results, due to the fact that the blocks have worn quite thin at the parts thus cooled with the result that the cooling system has had to carry away large amounts of heat, thus increasing the cost of cooling to an undesired extent. I do not provide, according to my invention, such cooling, but depend upon horizontally disposed cooling means effective adjacent to the metal line, where the cooling means may be operated at its maximum efficiency from the point of view of initial investments in and maintenance of the cooling system and from the point of view of the life of the structure as a whole.

While I have disclosed my invention as relating to "glass," I intend this term to be construed broadly to include any materials, which may be prepared or contained in structures of the general type described and wherein the problem of cooling is important, such, for example, as water glass, vitreous enamels, etc.

Furthermore, while I have shown but one specific embodiment of my invention, I contemplate that many changes may be made therein, certain of which have been suggested hereinabove. I do not wish to be limited, therefore, except by the scope of the appended claims, which are to be construed as broadly as the state of the prior art permits.

I claim:

1. In a container for a bath of molten glass, a glass confining wall built up of refractory material having its top surface so arranged and disposed in respect to the normal level of the bath of glass in the container that during the major part of the life of the container there will be a thin marginal portion of the glass of the bath extending over parts of said top surface from the main body of the bath toward the outside of the container, and a cooling means employing a liquid cooling medium and having a portion at least disposed inside the vertical plane of the outer face of said refractory material and terminating short of the periphery of the main body of the glass bath in the container, said portion of the cooling means being above but closely adjacent to the normal level of the bath of glass in the container for progressively cooling and freezing said marginal portion of glass to form a lateral boundary for the bath of glass in the container.

2. In a container for a bath of molten glass, a glass confining wall built up of refractory material having its top surface so arranged and disposed in respect to the normal level of the bath of glass in the container that during the major part of the life of the container there will be a thin marginal portion of the glass of the bath extending over parts of said top surface from the main body of the bath toward the outside of the container, a cooling means having a portion at least disposed within the vertical plane of the outer surface of said refractory material and terminating short of the periphery of the main body of the glass bath, said portion of the cooling means being above but closely adjacent to the normal level of the bath of glass in the container for progressively cooling and freezing said marginal portion of glass to form a lateral boundary for the bath of glass in the container, said portion of the cooling means being constructed as a metallic box closed except toward the outside of the container, and means for circulating a cooling liquid in said box to effect a progressive cooling of the marginal portion of the glass toward the outside thereof.

3. In a container for a bath of molten glass, a glass confining wall built up of refractory material having its top surface so arranged and disposed in respect to the normal level of the bath of glass in the container that during the major part of the life of the container there will be a thin marginal portion of the glass of the bath extending over parts of said top surface from the main body of the bath toward the outside of the container, a cooling means comprising a metallic box closed except toward the outside and extending from the outside toward the inside of the container at a level above but closely adjacent to the normal level of the bath of glass in the container for progressively cooling and freezing said marginal portion of glass to form a lateral boundary for the bath of glass in the container, and means for circulating a cooling liquid in said box to cool the marginal portion of glass progressively toward the outside of the container.

4. In a container for a bath of molten glass, a glass confining wall built up of blocks having vertically disposed inner and outer faces and having upper faces so arranged and disposed in respect to the normal level of the bath of glass in the container that during the major part of the life of the container there will be a thin marginal portion of the glass of the bath extending over parts of said upper faces from the main body of the bath toward the outside of the container, a cooling means having a portion at least disposed between the vertical planes of the inner and outer faces of said blocks and terminating short of the plane of the inner faces of said blocks, said portion of the cooling means being above but closely adjacent to the normal level of the bath of glass in the container for progressively cooling and freezing said marginal portion of glass to form a lateral boundary for the bath of glass in the container, said portion of the cooling means being constructed as a metallic box closed except to the outside of the container, means for circulating a cooling liquid through said box to cool the marginal portion of glass progressively toward the outside of the container, a breast wall above and vertically aligned with said confining wall, means arranged adjacent to said cooling means so as to be cooled thereby for independently supporting said breast wall, and a portion of said breast wall extending over and around the upper and inner portions of said metallic box to shield it from the intense heat within said container.

PAUL G. WILLETTS.